United States Patent [19]

Wirth

[11] 3,723,449
[45] Mar. 27, 1973

[54] CERTAIN FLUOROESCENT 2-(2-HYDROXY-PHTHALIMIDOMETHYL-PHENYL)-BENZOTHIAZOLES

[75] Inventor: Joseph G. Wirth, Schenectady, N.Y.

[73] Assignee: General Electric Company, Schenectady, N.Y.

[22] Filed: July 30, 1971

[21] Appl. No.: 167,838

[52] U.S. Cl. ............................260/304, 252/301.2
[51] Int. Cl. .....................C07d 99/10, C07d 91/44
[58] Field of Search........................260/304

[56] References Cited

UNITED STATES PATENTS

| | | | |
|---|---|---|---|
| 3,162,642 | 12/1964 | McCafferty | 260/304 |
| 3,491,106 | 1/1970 | Frgyermuth | 260/304 |
| 3,647,812 | 3/1972 | Smith | 260/304 |

*Primary Examiner*—Alex Mazel
*Assistant Examiner*—R. J. Gallagher
*Attorney*—James W. Underwood et al.

[57] ABSTRACT

Compared to the parent compound, phthalimidomethyl derivatives of 2-(2-hydroxyphenyl)benzothiazole have much lower vapor pressure and greatly improved ultraviolet stability. Both of these factors make these derivatives much better organic phosphors than the parent compound since they have greatly improved the useful lifetime of compositions where they have been incorporated to impart fluorescent properties. These new derivatives fluoresce with a yellow color.

5 Claims, No Drawings

CERTAIN FLUORESCENT 2-(2-HYDROXY-PHTHALIMIDOMETHYL-PHENYL)-BENZOTHIAZOLES

This invention relates to phthalimidomethyl derivatives of 2-(2-hydroxyphenol)benzothiazole. More particularly, this invention relates to the compounds having the formula,

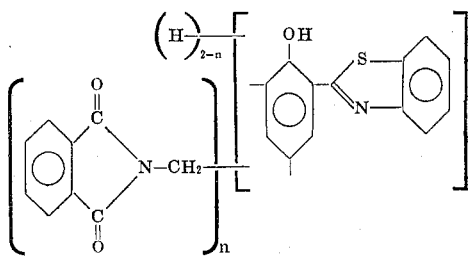

where $n$ is 1 or 2.

Although there are many known organic compounds which have fluorescent properties, generally the visible light which they emit is so weak that they can not be incorporated in minor amounts into other compositions to impart fluorescent properties thereto. Only very few organic compounds have strongly fluorescent properties so that they can be used in such applications. However, these materials generally are photochemically, oxidatively or thermally unstable at relatively low elevated temperatures so that upon long term exposure to ultraviolet light, air and especially at elevated temperatures, they lose their fluorescent properties. For most applications, requiring long-term stability of the fluorescent properties, inorganic phosphors have been used. Unlike organic materials, which depend upon their chemical structure for the fluorescent properties, inorganic materials depend upon a particular crystal structure for their fluorescent properties. This means that they can not be used in solution and also when incorporated as a solid into other compositions, care must be taken not to destroy the crystal structure responsible for the fluorescent property. For example, when incorporating such inorganic phosphors as pigments in a paint or other coating composition, great care must be taken not to shear or grind the pigment, thereby, destroying its crystal structure, during the operations necessary to disperse the pigment in the paint or coating composition.

As a powder, or dispersed pigment, one particle overlaying another particle will shield the latter from the exciting light. This means that there is a practical limitation, both on the concentration of the dispersed pigment in the coating composition as well as on the thickness of the coating composition which is deposited on an object if it is desired to excite from one side of the layer, for example, a self-supporting film or a coating on a transparent substrate and have the light emitted from the fluorescent pigment visible on the other side.

Many of the organic phosphors fluoresce with a blue color. This has made them very useful as optical brightners, to increase the apparent whiteness of textiles, paper, etc. There are many applications where it is desirable to have phosphors which fluoresce with a color in the longer wave length regions, i.e. in the green to red regions. One of the organic phosphors which fluoresces green is 2-(2-hydroxyphenyl)-benzothiazole. Although it has attained some commercial success, its high cost, its tendency to sublime and its tendency to lose its fluorescent properties with increased accumulated exposure to ultraviolet light have all been factors which have impaired its potential usefulness. Furthermore, it would be much more desirable if it would have a fluorescent color in the longer wave lengths.

Unexpectedly, I have found that the phthalimidomethyl derivatives of this compound possess greatly decreased vapor pressure, greatly increased ultraviolet stability and increased wavelengths of emitted light so that the compounds fluoresce with a yellow color. This was indeed surprising since its isologs 2-(2-hydroxyphenyl)benzoxazole and 2-(2-hydroxyphenyl)benzimidazole are also organic phosphors, but when they were substituted for 2-(2-hydroxyphenyl)benzothiazole in the hereinafter described reaction to produce their phthalimidomethyl derivatives, only nonfluorescent products, which were not further identified, were obtained. In addition, as disclosed and claimed in my copending application Ser. No. 167,833 filed concurrently herewith and assigned to the same assignee, I have found an improved process for producing the required starting material, 2-(2-hydroxyphenyl)benzothiazole which significantly reduces the cost of this material.

The phthalimidomethyl derivatives are readily made by reacting the parent compound with N-hydroxymethylphthalimide, which itself is made by reacting phthalimide with formaldehyde or a formaldehyde engendering agent. It is not necessary to first make the N-hydroxyphthalimide in a separate step since the parent compound, formaldehyde or formaldehyde engendering agent, e.g., paraform, trioxane, etc., and phthalimide can be reacted together to produce the phthalimidomethyl derivatives. The reaction is readily carried out at room temperature under acidic conditions in a solvent medium in which the reactants are soluble. A convenient, cheap and readily acidic solvent medium is concentrated sulfuric acid. In this reaction, the phthalimidomethyl group is substituted into the para or ortho position or both of these positions with respect to the hydroxyl group in the hydroxyphenyl ring.

Regardless of whether the stoichiometry for producing the mono-phthalimidomethyl or bis(phthalimidomethyl) derivative is used, I find that the product is a mixture of all three compounds with the amount of bis compound in the mixture increasing with the stoichiometry that favors its formation. The amount of 2-(2-hydroxy-3-phthalimidomethylphenyl)benzothiazole is less than its 5-phthalimidomethyl isomer and generally less than the bis compound. If the amount of phthalimide and formaldehyde or N-hydroxymethylphthalimide used exceeds more than about 2.1 moles per mole of the benzothiazole reactant, an as yet unknown reaction occurs, leading to a decrease in the fluorescent properties of the product.

Although the mixture of the three products obtained can be separated, for example, by chromatographic techniques, into the individual components, all three compounds fluorescence with a yellow color when exposed to ultraviolet light. Therefore, the mixture can be used for the same applications as the individual components and there is little incentive from a commercial point of view to warrant the cost of the separation. However, where it is desired to do so, they can be separated as will be shown in the following examples.

In order that those skilled in the art may better understand my invention, the following examples are given by way of illustration and not by way of limitation. In all the examples, all parts and percentages are by weight and temperatures are in degrees Centigrade unless otherwise stated. The elemental analyses are given with the determined values followed by the theoretical values in parentheses.

EXAMPLE 1

To a solution of 11.4 g. (0.05 mole) 2-(2-hydroxyphenyl)benzothiazole in 50 ml. concentrated sulfuric acid was added 10.6 g. (0.06 mole) N-hydroxymethylphthalimide. After stirring overnight at room temperature, the reaction mixture was poured into water. The white precipitate was collected on a filter and dried overnight at 60°C./20 mm. Extraction of the crude product with ether gave 0.9 g. of a white, highly fluorescent material identical with compound I, identified below as 2-(2-hydroxy-5-phthalimidomethylphenyl)benzothiazole along with a trace amount of unreacted 2-(2-hydroxyphenyl)-benzothiazole. The ether insoluble residue was treated with chloroform and 3.0 g. insoluble, nonfluorescent solid was removed by filtration. This material was not further investigated. Evaporation of the chloroform solution gave 17.0 g. of a white, highly fluorescent solid which was a mixture of three compounds, I, II and III. Separation of the mixture was achieved by column chromatography.

A 6.0 g. portion of the chloroform soluble mixture was adsorbed in a narrow band on a 350 g. silica gel chromatographic column and eluted with a graded series of solvents beginning with petroleum ether (30°–60 °C. boiling range) then ether, benzene and finally chloroform/methanol. Compound I, m.p. 211°–213°C., was eluted with benzene. Wt. 2.25 g. It was shown to be 2-(2-hydroxy-5-phthalimidomethylphenyl)-benzothiazole by NMR (proton and C$^{13}$) and IR spectra and by analysis: C, 67.9 (68.4 ); H, 3.7 ( 3.7 ); N, 7.2 (7.3 ). Compound II, m.p. 280°–285°C., was eluted shortly after I also with benzene. Wt. 0.20 g. It was shown to be 2-(2-hydroxy-3-phthalimidomethylphenyl)benzothiazole by NMR (proton) and IR spectra and by analysis: C, 68.5 (68.4 ); H, 3.8 ( 3.7 ); N, 7.3 ( 7.3 ). Compound III, m.p. 309°–312°C. with decomposition, was eluted with chloroform and 1% methanol/chloroform. Wt. 2.96 g. Its structure was shown to be 2-[2-hydroxy-3,5-bis(phthalimidomethyl)phenyl]benzothiazole by NMR and IR spectra and the following analysis: C, 68.1 ( 68.2); H, 3.7 ( 3.5 ); N, 7.8 ( 7.7 ).

EXAMPLE 2

This example shows the reaction of an equimolar mixture of 2-(2-hydroxyphenyl)benzothiazole and N-hydroxymethylphthalimide. To a solution of 5.54 g. (0.02 mole) 2-(2-hydroxyphenyl)benzothiazole dissolved in 20 ml. concentrated sulfuric acid was added 3.54 g. (0.02 mole) N-hydroxymethylphthalimide and the resulting solution was stirred overnight at room temperature. The reaction mixture was poured into water and the white precipitate was collected on a filter. Trituration of the solid with ether and subsequent evaporation of the ether gave 1.0 g. of material consisting principally of unreacted 2-(2-hydroxyphenyl)benzothiazole. The ether insoluble residue was treated with chloroform and a small amount of insoluble solid was removed by filtration. Evaporation of the chloroform gave 5.0 g. (57 percent) of a mixture of compounds I, II and III.

A small amount of this mixture (2 percent by weight) was dispersed in Carnauba wax by heating the wax to its melting point. On cooling, the wax rehardened and was broken up into a fine white powder which exhibited a bright yellow-green fluorescence under ultraviolet light. The fluorescence was maintained with little loss of intensity for a period of 400–500 hours exposure to 2,537A. light. This contrasts with the parent compound, 2-(2-hydroxyphenyl)benzothiazole, which loses nearly all its fluorescence after 50–75 hours exposure under similar conditions.

EXAMPLE 3

A 1.62 g. (0.011 mole) portion of phthalimide and 0.33 g. (0.011 mole) paraformaldehyde were dissolved in 10 ml. concentrated sulfuric acid. To this solution was added 2.27 g. (0.010 mole) 2-(2-hydroxyphenyl)benzothiazole. A pale pink color was observed and the temperature rose to about 50°C. After stirring for 6 hours, the reaction mixture was poured into water and the white solid which precipitated was collected on a filter. Extraction of the solid with ether gave after evaporation of the ether, 0.6 g. of material consisting mainly of unreacted 2-(2-hydroxyphenyl)benzothiazole. The ether insoluble solid was treated with chloroform and 0.5 g. of insoluble, nonfluorescent solid was removed by filtration. This material was not further investigated. Evaporation of the chloroform gave 2.9 g. of a highly fluorescent white solid consisting of a mixture of compounds I, II and III.

EXAMPLE 4

To a solution of 3.24 g. (0.022 mole) phthalimide and 0.66 g. (0.022 mole) paraformaldehyde in 10 ml. concentrated sulfuric acid was added 2.27 g. (0.010 mole) 2-(2-hydroxyphenyl)-benzothiazole. The solution became pink in color and the temperature rose to 60°C. After stirring overnight the reaction mixture was poured into water and the white precipitate collected on a filter. The material was completely soluble in chloroform. Examination by thin layer and gas-liquid chromatography showed the solid to be a mixture of a small amount of unreacted 2-(2-hydroxyphenyl)benzothiazole along with compounds I, II and III. Yield 4.90 g. (90%).

The above examples and description have illustrated many of the variations and modifications of the invention. Many other wide and useful applications, in addition to those already disclosed, may be made of the compositions of this invention, especially when incorporated in various resinous compositions. For example, they may be incorporated in a lacquer or plastic com-

What I claim as new and desire to secure by Letters Patent of the United States is:

1. Chemical compounds having the formula,

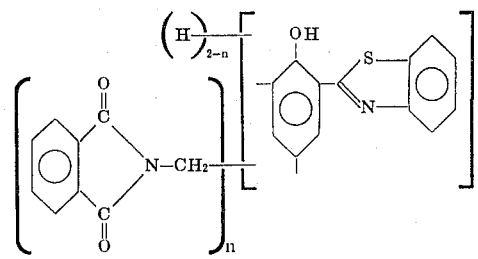

where $n$ is 1 or 2.

2. The compound of claim 1, where $n$ is 1 and the phthalimidomethylene group is in the ortho position with respect to the hydroxyl group.

3. The compound of claim 1, where $n$ is 1 and the phthalimidomethylene group is in the para position with respect to the hydroxyl group.

4. The compound of claim 1, where $n$ is 2.

5. A mixture of at least two of the compounds of claim 1.

* * * * *

UNITED STATES PATENT OFFICE
CERTIFICATE OF CORRECTION

Patent No. 3,723,449                    Dated March 27, 1973

Inventor(s) Joseph G. Wirth

It is certified that error appears in the above-identified patent and that said Letters Patent are hereby corrected as shown below:

Column 2, line 45, after "readily" insert - available -;
Column 5, line 1, change "in" to - on -.

Signed and sealed this 18th day of December 1973.

(SEAL)
Attest:

EDWARD M. FLETCHER, JR.                 RENE D. TEGTMEYER
Attesting Officer                        Acting Commissioner of Patents